Oct. 23, 1956    C. A. WHITTINGTON    2,767,632
CULTIVATOR
Filed Sept. 25, 1952
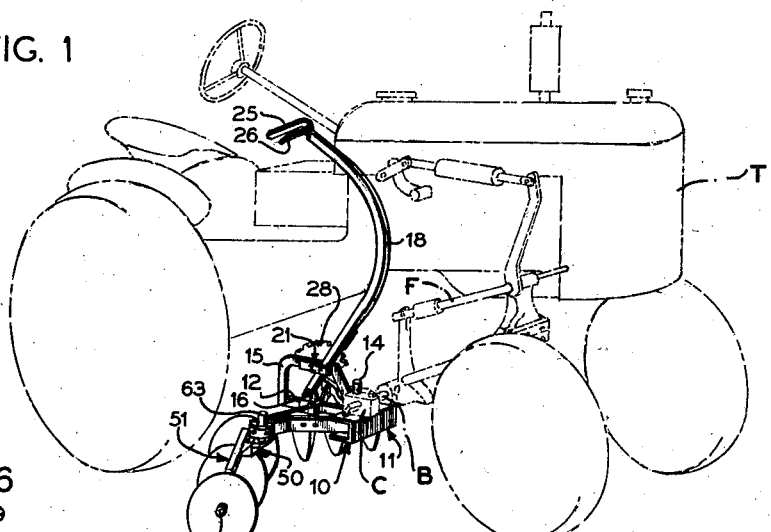
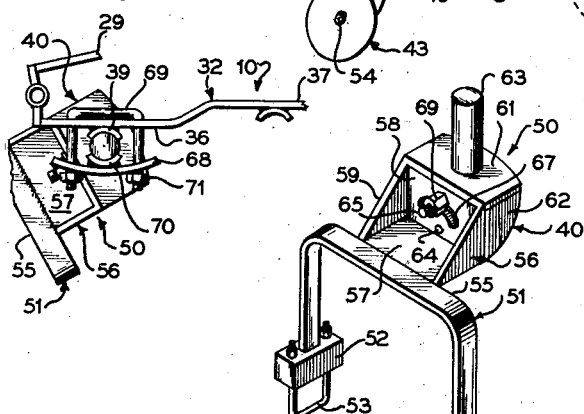
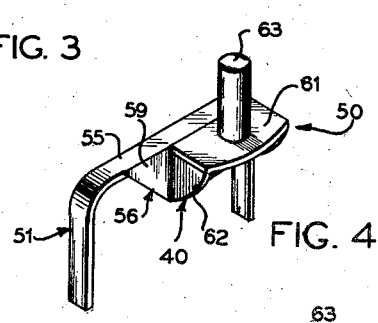
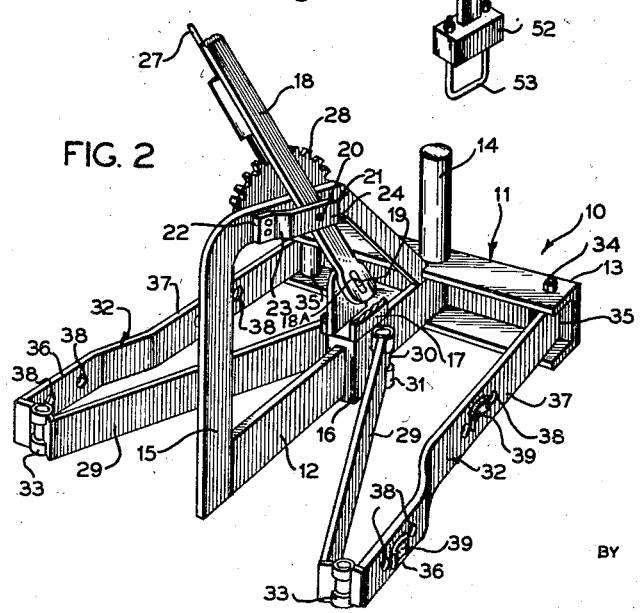
INVENTOR
C. A. WHITTINGTON
BY A. Yates Dowell
ATTORNEY

# United States Patent Office 2,767,632
Patented Oct. 23, 1956

2,767,632

CULTIVATOR

Clarence A. Whittington, Benson, N. C., assignor of one-half to Claude C. Canaday, Sr., Claude C. Canaday, Jr., and Harry E. Canaday, all of Johnston County, N. C.

Application September 25, 1952, Serial No. 311,398

2 Claims. (Cl. 97—54)

This invention relates to agriculture including cultivation of the soil, and more particularly to a cultivator of the character designed to move the soil from between rows of plants onto the rows in order to provide the necessary earth in a mound for protecting the plants against drought or excessive rainfall, and at the same time to keep the roots of the plants covered and with sufficient soil conveniently available thereto to provide the substance which the plant obtains from the soil.

At various times and particularly after row crops are growing above the ground it is desirable that some of the dirt between adjacent rows be scooped out and moved onto the rows. This operation is known as "hilling" and provides advantages such as permitting the crops to better withstand a drought, and also affords natural drainage so that in the event of excessive rainfall water will drain therefrom without damaging the crop.

Cultivators of this character have been used heretofore but these have generally consisted of a relatively large disc used singly and are not adjustable in the manner about to be described.

Accordingly, it is an object of the present invention to provide a cultivator or disc hiller adapted for attachment to a standard tractor mounting frame and which has easily adjustable mounting for the discs in order that the spacing between sets of discs may be varied.

A further object is the provision of a cultivator attachment particulary designed to carry a pair of cultivator implements, in which provision is made for easily and quickly adjusting the distance between the implements.

A further object is the provision of a cultivator attachment for carrying one or more discs or the like, in which the angle of the disc with respect to the axis of the tractor may be easily adjusted.

A further object of the invention is the provision of a cultivator attachment for carrying two or more discs in which the angle of the discs to the ground may be easily adjusted.

These and other objects of the invention will become apparent from the following description in conjunction with the accompanying drawings, in which:

Fig. 1 is a perspective illustrating a cultivator constructed in accordance with the present invention mounted on a tractor, the latter being shown in phantom;

Fig. 2 is a perspective to an enlarged scale illustrating the adjustable frame assembly, and with the upper portion of the operating lever arm broken away, part of the slide being broken away to show the connection thereof to the operating lever;

Fig. 3 is a perspective to an enlarged scale illustrating the details of the disc mounting member;

Fig. 4 is a perspective from the front of the device of Fig. 3;

Fig. 5 is a vertical section of the device, as shown in Fig. 3, and

Fig. 6 is a top plan view illustrating the manner of connecting the device of Fig. 3 to the frame assembly of Fig. 2.

Briefly stated the embodiment of the invention disclosed includes a T shaped frame having a post extending upwardly from the inter-section of the T for attachment to the tool bar of the tractor. A slidable member is mounted on the main bar of the T and is attached by pivotally mounted arms to an end of a bar on either side thereof, the latter being pivotally attached to members extending from the ends of the crossbars of the T, whereby the slidable member may be moved along the main bar of the T to adjust the distance between the ends of the members and the main bar of the T. A disc mounting member is attached to either or both of the members extending from the end of the T crossbars and has the discs attached to it. The disc mounting members may be rotated to the desired angle with respect to the axis of the tractor and are constructed so that the axes of the discs may be adjusted at varying angles to the earth.

Referring to the drawing a tractor T is shown having a conventional mounting frame F with a tool bar B carried thereby. The tool bar has a clamp C for receiving an upstanding post from any one of a number of tractor implements or attachments.

Referring more particularly to Fig. 2, applicant's device includes a frame assembly 10 which has a T shaped member 11 with a main bar member 12 of flat stock and a crossbar member 13 of channel stock, an end of the member 12 being received between the sides of the channel. A post or standard 14 extends laterally from crossbar member 13 adjacent the intersection of it and the main bar member 12. A bracket 15 extends up over the main bar member 12, the ends of the bracket being attached to the ends of the bar member 12, the bracket and the bar member lying in substantially the same plane.

Mounted on the main bar member 12 is a slider 16 which can be moved to any desired position along the bar member 12. Attached to the upper portion of the slider 16 is a pair of spaced tangs or ears 17 which receive the end of a lever 18. The lower end of lever 18 is provided with an elongated slot 18A which loosely receives a pin extending between ears 17, 17 so that when the lever 18 is rotated by releasing rod 27 the slide 16 may be moved upwardly or backwardly without binding. The lever 18 is pivotally mounted by pin 20 on a pivot arm 21, the arm being of substantially Z-shaped configuration. The arm has a short end 22 rigidly connected to the upper portion of the bracket 15, an offset portion 23, and a main portion 24 to which the pin 20 is attached, the lever being mounted between the portion 24 and the upper portion of the bracket 15.

The operating lever is curved back at its upper portion as disclosed in Fig. 1, in order to be easily accessible to the operator of the tractor, and has an operating handle 25. Adjacent the operating handle 25 is a lever 26 which is attached to an end of and controls the position of a spring pressed rod 27, the other end of the latter being engageable with a gear segment 28 fixed to the side of the bracket 15 opposite the member 21.

On either side of the slider 16 a spacer arm 29 is attached by pivot members 30 and 31. At the other end of each of the spacer arms a support arm 32 is pivotally connected by a hinge 33 at one end thereof, the other end of the support arm terminating in a loop 35 which engages a post 34 extending between the channels of the T crossbar at either end thereof. The support member 32 has a relatively short portion 36 at the end nearer the hinge 33 and a comparatively longer portion 37 offset therefrom toward the axis of the T. A pair of spaced bolt receiving apertures 38 are provided substantially centrally of each of the portions 36 and 37, and a curved plate 39 is positioned between each of the pairs of apertures 38.

The frame assembly just described may be employed for the mounting of various types of agricultural implements, however, the invention is particularly directed to the provision of adjustable means for carrying hiller discs as shown in Fig. 1. While a set of three discs 43 is disclosed as attached to each side of the frame the invention is not limited to the particularly number of discs shown or to the number of groups shown. In other words, the invention is usable for a plurality of discs; either or both sides of a frame may be employed for the mounting of one or more sets of discs and one or more frames may be used on a tractor in accordance with the requirements of the cultivating that is to be performed.

In order to mount a set of discs on the frame a disk carrier 50, as disclosed in detail in Figs. 3, 4, 5, and 6 is provided. The disc carrier has a yoke 51 in the shape of an inverted U with a lock block 52 at either end thereof. Below each block a U-bolt 53 extends for engagement with the shaft 54 carrying the discs 43, the discs being supported on the shaft in spaced relation by conventional means.

The web 55 of the yoke has an angle member 56 extending laterally therefrom, the angle member having a floor plate 57, a front plate 58, and triangularly shaped side plates 59, the floor, front, and side plates being rigidly connected together. Adjacent the front face of the plate 58 is a post support member 40 which includes a back plate 60, a top plate 61 and side plates 62, a post or standard 63 being rigidly connected to and extending upwardly from the top plate 61. The back plate 60 is of similar configuration to the front plate 58 and is placed in substantial contact therewith, a pivot pin 64 extending through the lower portions of the plates so that there may be relative pivotal movement therebetween. In order to lock the members 56 and 40 in the desired relative position a bolt 65 extends through an aperture 66 in the back plate 60 and through an arcuate slot 67 in the front plate 58, a nut 69 engaging the bolt and the front plate 58 adjacent the arcuate slot.

The disc carrier 50 is mounted on the frame 10 by positioning the post 63 against the curved plate 39 on the support member 32 of the frame and attaching it thereto by means of a leaf member 63 having spaced apertures for the reception of the legs of U-bolt 69a, a curved plate 70 being carried by the leaf member 68 for engagement with the side of the post 63 opposite the portion engaged by the curved plate 39. By adjustment of the nuts 71 on the U-bolt 69a the angle which a set of discs makes with the line of travel of the tractor may be varied.

In the operation of the device one or two disc carriers are attached to the support arms 32 of the frame 10. With the tractor positioned adjacent to the rows which it is desired to hill the angle which each set of discs makes with the row is adjusted by rotating the post 63 between the curved plates 39 and 70 to the desired position and locking it in this position by tightening the nuts on the U-bolt. With the axis of the discs extending at substantially right angles to the row substantially right angles to the row substantially no dirt is moved toward the row. As the angle is decreased a correspondingly greater amount of dirt is moved toward the row. In like manner, if the discs are in substantially level or horizontal position a relatively flat ditch is scooped out between the rows. In order to scoop a deeper ditch, and at the same time to provide that the disc nearest to the roots will not dig as deep as those farther therefrom the angle that the discs make with the ground may be varied by tilting the member 40 with respect to the member 56. When the desired angularity is obtained the nut 69 may be tightened to hold the discs in their desired position.

The discs may be easily adjusted for rows of various widths by the operator, without leaving his seat, through the operation of the lever 18. Movement of the lever 18 shifts the position of the slider 16 along the bar 12, moving the support arms 32 about the posts 34, thus moving the portions 36 of the arms which carry the posts 63 of the disc carrier either toward or away from the bar 12.

From the foregoing it will be understood that the embodiment of the invention includes a mounting frame 10 which may be easily attached to a conventional tractor. The frame has pivotally mounted support arms 32 to which disc carriers 50 may be attached, and the spacing of the portion of the arms carrying the disc carriers may be varied by adjusting the position of a slider along a member 12 of the frame 10, the slider 16 being swivelly attached to the support arm. The positioning of the slider is controllable by means of a lever 18 which extends to within the reach of the operator of the tractor. The disc carrier 50 is adjustably attached to the support arms 32 so that the discs 43 may be turned at a desired angle to the line of travel, and the angularity of the disc with respect to the ground is likewise adjustable by means of a pin and slot mechanism 65—69.

It is be apparent to those skilled in the art that the invention is not restricted to the specific embodiment disclosed but includes reasonable variations therefrom and is therefore only limited in scope as defined in the following claims.

What is claimed is:

1. A cultivator comprising a supporting frame for movement along a row of crops, elements mounted on said supporting frame for movement toward and away from one another and substantially transversely to the line of travel of said supporting frame, operating means connected to said elements for moving the said elements toward or away from each other, quick-releasable means for holding said operating means in a given position, a cultivator unit comprising a U-shaped yoke, a shaft mounted at the ends of said yoke, a plurality of cultivating disks mounted on said shaft, quick detachable means for securing the shaft to the free ends of the yoke and comprising a first shaft engaging member connected to a leg of the yoke, a second shaft engaging member on the opposite side of the shaft from the first shaft engaging member, and fastening means holding the first and second shaft engaging member in clamping engagement with the shaft; a post, means connecting said post to the central portion of said yoke, said connecting means having interengaging parts permitting angular adjustment of said yoke with respect to said post when loosened and maintaining the angular relationship when tightened, means for connecting said post to said frame elements, said last-mentioned connecting means comprising curved plates adjustably clamping said post to permit angular adjustment of said cultivator unit with respect to said frame elements when loosened and maintaining the angular relationship when tightened.

2. A cultivator structure comprising a frame having a longitudinally extending member, a second member fixed to said longitudinally extending member and having pivots in spaced relation to said longitudinally extending member, support members pivotally mounted in said pivots, a slide mounted on said longitudinally extending member, links pivotally connected to the outer ends of said support members and to the slide, means for moving the slide from a position close to said pivots to a position approximately transverse to the connection between said links and said support members whereby the support members may be moved toward and away from one another about said pivots; a U-shaped yoke having three cultivator discs mounted on a shaft with one disc positioned between the legs of the yoke, quick detachable means to secure the shaft to the free ends of the legs of the yoke whereby the yoke and the discs are secured in a definite relation, a post, means connecting said post to said yoke whereby the yoke may be angularly adjusted with respect to said post, said post being attachable to a selected one of said support members so that the post may be adjusted in angular relation to said one support member, said quick detachable means comprising a first shaft engaging member connected to a leg of the yoke, a second shaft engaging member on the opposite side of the shaft from the first shaft engaging member, and fastening means holding the first and second shaft engaging members in clamping engagement with the shaft.

References Cited in the file of this patent

UNITED STATES PATENTS

| | | |
|---|---|---|
| 435,655 | Rose et al. | Sept. 2, 1890 |
| 436,472 | Cobb | Sept. 16, 1890 |
| 462,294 | Bement | Nov. 3, 1891 |
| 926,063 | Helmlinger | June 22, 1909 |
| 1,178,767 | Waterman | Apr. 11, 1916 |
| 1,283,679 | Copeland | Nov. 5, 1918 |
| 2,588,872 | Price | Mar. 11, 1952 |
| 2,632,371 | Shoemaker | Mar. 24, 1953 |

FOREIGN PATENTS

| | | |
|---|---|---|
| 417,533 | France | Nov. 16, 1909 |
| 449,322 | Germany | Sept. 10, 1927 |